(No Model.)
A. M. AMOS.
STEAM COOKER.
No. 255,232. Patented Mar. 21, 1882.
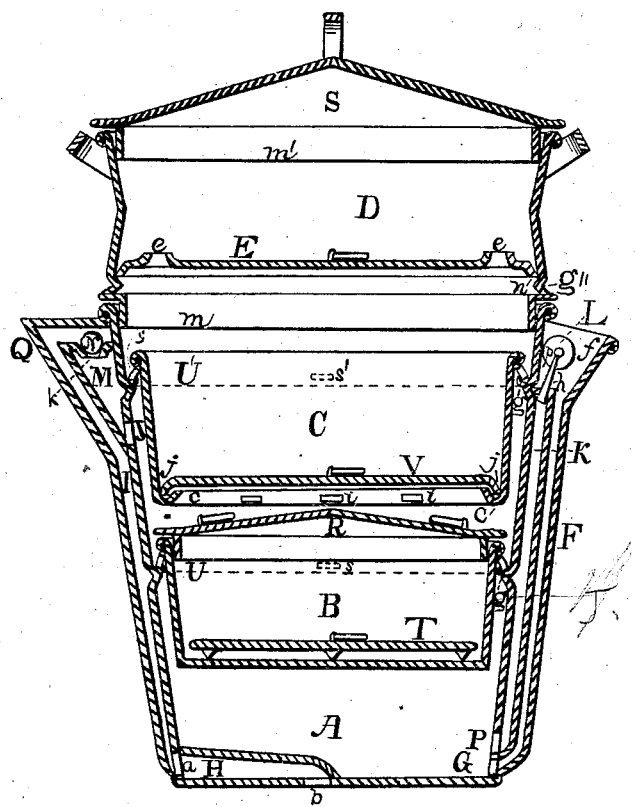
Witnesses:
J. H. Lynch
W. S. Chandler
Inventor
Alexander M. Amos.

UNITED STATES PATENT OFFICE.

ALEXANDER M. AMOS, OF SYRACUSE, NEW YORK.

STEAM-COOKER.

SPECIFICATION forming part of Letters Patent No. 255,232, dated March 21, 1882.

Application filed December 19, 1881. (No model.)

*To all whom it may concern:*

Be it known that I, ALEXANDER M. AMOS, of Syracuse, county of Onondaga, New York, have invented a new and useful Improvement in Steam-Cookers, of which the following is a specification.

My invention relates to certain improvements upon the steam-cooker for which Letters Patent No. 220,048 were granted to me September 30, 1879, the novelty of which consisted in a whistle connected with a float by means of a rod, the said float and whistle operating in a tube having a stopper for the purpose of gaging the water in the said cooker and sounding an alarm. The purpose of the above-named improvement is to simplify the arrangement, so as to accomplish the same or similar results without the use of the said float or rod or stopper.

It has reference to an arrangement for regulating the escaping steam by means of a self-adjustable valve operating within a tube that communicates with the stove.

It also relates to a device for changing the outlet for the steam from one part of the cooker to another for the purpose of sounding an alarm by means of a steam-signal placed in a tube having an aperture at the lower end, in combination with the aforesaid valve.

It also has reference to a tube within a tube, one of which is for the steam-signal and the other for the admission of water. The said tubes are so arranged that no stopper is needed in the water-tube to prevent the escape of steam.

The steam-whistle in the inner tube is covered and protected by the outer tube, so as not to be damaged in any way, and the condensed steam from the whistle is made to flow down the water-tube into the water instead of falling on the stove; and it finally consists of an arrangement by which the water in the lower section is replenished with the condensed steam from the upper sections without mingling with the food as it passes down from one section to another.

I attain these objects by the mechanism illustrated in the accompanying drawings.

The body of the cooker is flaring in shape, being larger in circumference at the top than the bottom, and is provided with dishes B C, and flaring ring D, having a movable bottom, E, and a cover, S. When in use the stove-cover is removed and the cooker is placed directly over the fire. A tube, F, is placed over the tube K, having a spout, $f$, and an aperture, G, for the admission of water into the lower section, A.

L is a hollow ball of any suitable size, and made of any suitable material, having a perforation, $p$, and a small tube, $h$, as shown. The tube K is attached to the exterior of the cooker within the tube F, being connected with the tube $h$ at the upper end, and having an aperture, P, at the lower end. When the water is above the aperture P the surplus steam and the odor from the food are made to pass into the stove through the aperture J, spout M, cap Q, tube I, aperture $a$, tube H, and aperture $b$, as shown. When the water does not cover the aperture P the steam escapes through the tube K and the small tube $h$; and, coming in contact with the upper edge of the perforation $p$ in the hollow ball L, an alarm is sounded to indicate that more water is needed. As the steam continues to escape through the tube $h$ condensed steam will collect in the ball L and overflow and pass down the tube F and mingle with the water in section A. When the steam commences to escape through the aperture P the water is above the aperture G, so that no stopper is needed in the spout $f$ to prevent the steam escaping from the tube F.

A small round ball, N, is placed over the aperture $k$ in the spout M, which is made to serve the purpose of a self-adjustable and self-regulating valve to regulate the escape of steam. When the water in section A is above the aperture P there is sufficient force of steam to move the ball N and escape into the stove; but when the water has boiled away, so that the steam escapes through the aperture P, the force of the steam is partially removed from the ball N, and it falls and closes the spout M. By this arrangement the outlet for the steam is changed automatically from the aperture $k$ to the aperture P, and a greater force of steam is made to pass through the whistle L, and a louder and more distinct signal is thereby secured. The aperture $k$ is depressed, as shown, so as to form a cavity to receive the ball N, which is kept in position by the force of its own weight, and is made to operate freely and open and shut without the use of any hinge or other fastening. When the ball is slightly raised by the force of the steam it will come in contact with the top of the cap Q, thus preventing it from being displaced.

The ball N may be made of glass or clay or any suitable material, and the aperture k may be closed by a dead weight of any suitable shape.

By using a dead-weight, as above described, without any hinge or other fastening, a reliable and uniform tension is secured, as the ball can be made of any suitable weight.

The second section consists of a dish, B, having a cover, R, for cooking meat and other kinds of food with the dry heat of steam, so as to prevent any waste from evaporation or burning. When the dish B is required for cooking food by steam the movable bottom T is used for the purpose of keeping the vegetables and other things separate from the condensed steam, and the cover R is not required.

The third section consists of a ring, C, with a flange, c, turned inward and upward for the purpose of supporting the movable bottom V. A flange, j, around the movable bottom V is turned downward, as shown. The condensed steam or any other liquid in section C is made to flow over the flange j and through the perforations i to the lowest point of the ring C and flange c, and, falling from that point, it will strike the inner wall of the cooker near the bead g and flow down into the water in section A without mingling with the food in section B. The dish B and the ring C are supported by flaring rings U U', resting on the beads g g', and having perforations s s', for the admission of steam from one section to another.

Section four consists of a ring, D, having a rim, m, and a movable bottom, E, with a flange, n, resting on the bead g'', and having perforations, e e, for the admission of steam. The perforations e e are pressed from the under side, and a slight elevation is formed around each perforation, as shown, so that the condensed steam and other liquids will flow over the flange n to the bead g'', and from thence to the water in section A without passing through the perforations e e or mingling with the food in sections C and B.

The hollow ball L, having a perforation, p, and a tube, h, may be made square or of any suitable shape.

The ring D is smaller in circumference at the center than the top, and is made to flare upward, being the same in circumference, and having the same flare at the top as the flare of the body of the cooker. By this arrangement the flaring shape is maintained throughout, and only one cover, S, is needed instead of two separate covers. The rims m m' are made so as to fit or bind on the lower extremity, as shown, and if made of pliable metal the rims will be somewhat elastic at that point, and by being pressed down they will yield sufficiently so as to form a steam-tight cover and prevent the steam and odors from escaping.

Having fully described my invention, what I desire to claim as new, and secure by Letters Patent, is—

1. The combination, in a steam-cooker, of the ball N, which is placed over the aperture k in the spout M, with the aperture J, tube K, having an aperture, P, and a whistle, L, substantially as set forth and described.

2. The combination of the tube K within the tube F, having an aperture, P, above the aperture G, and a whistle, L, within the spout f, substantially as shown, and for the purpose set forth.

3. The combination, in a flaring steam-cooker, of the ring C, having a flange, c, with perforations i i, and a movable bottom, V, with a flange, j, movable ring U', having perforations s', the dish B, and movable ring U, substantially as and for the purpose set forth.

4. The combination, in a flaring steam-cooker, of the ring D, flaring from the center upward and downward, and having a rim, m, corresponding with the rim m' of the cover S, and binding on the lower extremity, substantially as shown and described.

5. The combination of the ring D, having a movable bottom, E, with a flange, n, resting on the bead g'', and having raised perforations e e, the rim m, cooker A, ring C, dish B, and cover S, substantially as and for the purpose set forth.

ALEXANDER M. AMOS.

Witnesses:
CHAS. ROBLEE,
CLARK R. RICE.